United States Patent [19]

Persson

[11] 4,281,838
[45] Aug. 4, 1981

[54] SEAL

[75] Inventor: Stig Persson, Katrineholm, Sweden

[73] Assignee: Aktiebolaget SKF, Gothenburg, Sweden

[21] Appl. No.: 72,184

[22] Filed: Sep. 4, 1979

[30] Foreign Application Priority Data

Oct. 5, 1978 [SE] Sweden ................................ 7810426

[51] Int. Cl.$^3$ ............................................. F16J 15/44
[52] U.S. Cl. ........................................ 277/53; 277/152
[58] Field of Search ..................... 277/152, 53, 68, 227

[56] References Cited

U.S. PATENT DOCUMENTS

| 2,878,048 | 3/1959 | Peterson | 277/227 |
| 3,013,824 | 12/1961 | Wilson | 277/53 |
| 4,159,828 | 7/1979 | Persson et al. | 277/152 |
| 4,165,085 | 8/1979 | Persson | 277/152 |

Primary Examiner—Robert I. Smith
Attorney, Agent, or Firm—Eugene E. Renz, Jr.

[57] ABSTRACT

A seal for a space between two surfaces which are movable relative to each other such as a shaft engaging through an opening in a housing or the like comprising a seal body made of an elastic material adapted to be secured to one of the surfaces such as the housing. A groove is formed in the seal body which confronts the other surface periphery of the shaft and is formed by a pair of spaced wall portions which converge inwardly toward the other surface so that the base of the groove is wider than the groove at the outer terminal edges of the wall portions. A flexible strip is seated in the groove and has a face confronting the other surface coated with a fiber flock projecting beyond the terminal edges of the wall portions. The strip is of a transverse dimension greater than the spacing between the terminal ends of the wall portions so that the strip and fiber flock are self-supporting in the groove and may be easily assembled therein and removed for replacement when desired. The seal also includes a pair of outwardly directed sealing flanges on either side of the groove formed integrally with the seal body.

2 Claims, 3 Drawing Figures

SEAL

BACKGROUND OF THE INVENTION

The present invention relates to a seal particularly adapted for sealing the annular space between relatively rotatable surfaces of machine elements or the like.

The demands on a seal is that it shall have a good sealing ability, good mechanic and chemical stability, it shall be cheap to manufacture and simple to assemble. A friction seal thereabove must not cause too large friction losses. For obtaining the desired strength, sealing and friction properties it is earlier known to produce seals of several different materials. It is for instance earlier known different combinations of metal and rubber, metal and plastic, rubber and plastic and of different plastic materials. The different materials are generally undetachably connected to each other, which may be advantageous for the handling of the seal but which often causes difficulties at the manufacture thereof.

The purpose of the present invention is to provide a stable and efficient seal, which is simple and cheap to manufacture and easy to handle.

The characteristics of the invention are defined in the accompanying claims.

BRIEF DESCRIPTION OF THE DRAWING

The invention will hereinafter be further described with reference to the accompanying drawing, in which.

BRIEF DESCRIPTION OF THE PREFERRED EMBODIMENT

Figure 1:
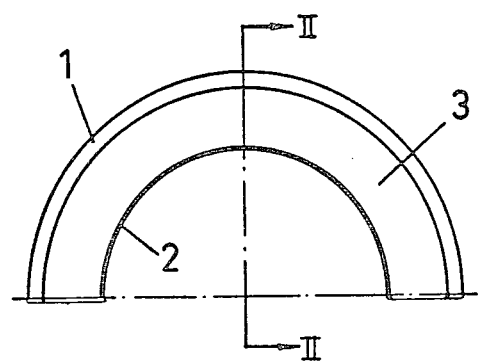
FIGS. 1 and 2 show a side view and a cross-sectional view respectively of one half of a seal according to an embodiment of the invention.
Figure 2:
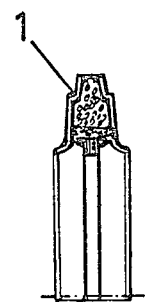

A seal according to the invention can preferably be used for sealing off a slot between a cylindric shaft and an element enclosing the shaft, e.g. a bearing housing having a circular bore. Such a seal is frequently made in two halves for making possible a simple assembly, one half of which is shown in FIG. 1. The sealing body is intended to be fitted in the element enclosing the shaft and it is for this purpose preferably provided with a ridge 1 situated along its outer circumference and intended to be inserted in a corresponding groove in said element. The portion at the inner circumference 2 is intended to engage the shaft and the remainder of the sealing body 3 is to cover the slot between the shaft and the enclosing element.

Figure 3:
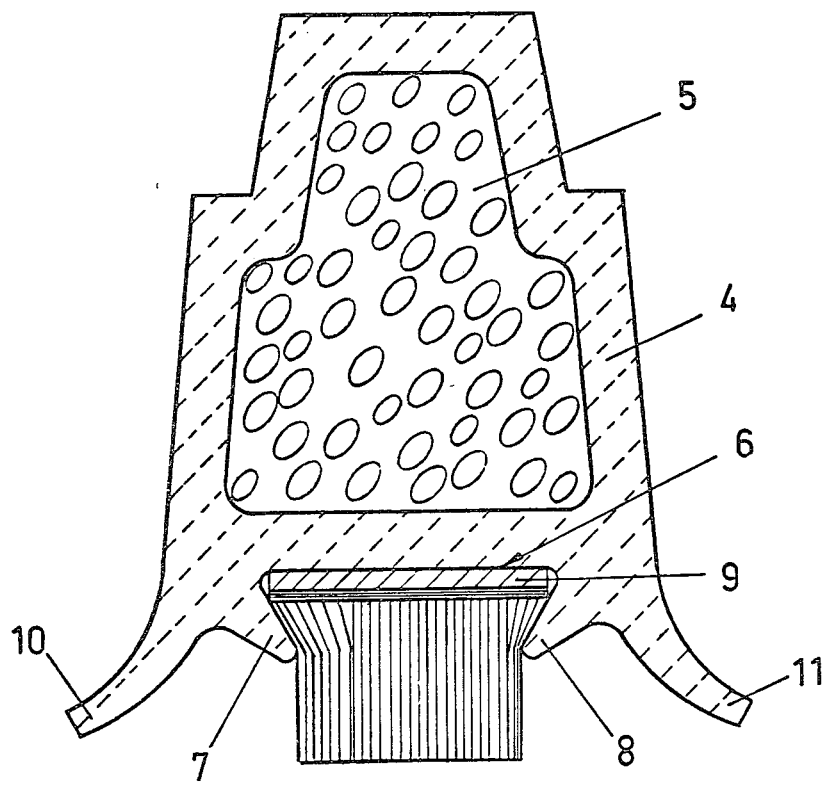
FIG. 3 shows an enlargement of the cross-section according to FIG. 2.

The design of the seal can best be seen in FIG. 3. The sealing body is preferably made of an integrated foamed plastics, e.g. polyurethane, and it has a homogeneous and relatively rigid surface layer 4 and a porous central portion 5. Around the inner circumference the sealing body is provided with a groove 6 having walls 7, 8 which are converging towards the opening. A flexible strip 9 is inserted in the groove. One side of the strip turned against the opening of the groove 6 is coated with a fibre flock, which extends through the opening of the groove and is intended to contact the shaft. In the embodiment shown there are arranged sealing lips 10, 11 at each side of the groove. Those are intended to sealingly contact the shaft and they are formed as integral parts of the sealing body. As the sealing lips are comparatively thin their edges will be pliable and flexible in spite of the fact that they are made of a homogenous plastic material and this will ascertan a good strength and low friction.

A strip 9 of polyamide which has been coated with polyamide fibres with a flocking method, which is known per se, and which fibres are some millimeters long, is suitable for use as a sealing element. Such an element is very cheap to manufacture and it can be easily inserted in the groove 6 in the sealing body of integrated foamed plastic. Such bodies can easily be made e.g. by moulding, whereby the undercuttings defined by the walls 7 and 8 will cause no problems as the walls are flexible and the bodies easily can be wriggled out of the mould.

Other embodiments of the invention than the one described are possible within the scope of claim 1. It is for instance possible to use other materials than polyamide for the flock strip and polyurethane for the sealing body. One or both sealing lips 10, 11 can be eliminated and the sealing body can have any shape corresponding to the slot, which shall be sealed off. The slot and thereby the sealing body can for instance be straight or it can have another curvature than the arc form. The porous central portion 5 can if required or desired be filled with a lubricant and channels can be arranged between this portion and the fibre flock of the strip 9.

I claim:

1. A seal for a space between two surfaces which are movable relative to each other comprising a seal body made of an integrated foamed plastic having a homogeneous surface layer and a porous central portion material adapted to be secured to one of the surfaces, means defining a groove in the seal body confronting the other surface and formed by a pair of spaced wall portions which converge inwardly toward said other surface so that the base of the groove is wider than the groove at the outer terminal edges of the wall portions, a sealing lip projecting angularly outwardly to one side of said groove, said sealing lip forming an integral part of said seal body and engagable with said other surface a flexible strip seated in said groove and having a face confronting the other surface coated with a fiber flock projecting beyond the terminal edges of said wall portions, said strip being of a transverse dimension greater than the spacing between the terminal ends of the wall portions so that the strip and fiber flock are self-supporting in said groove and may be easily assembled therein.

2. A seal according to claim 1 wherein said seal body is curved in the shape of an arc for sealing of the annular space between a cylindric shaft and a member having a circular bore enclosing the shaft.

* * * * *